United States Patent [19]

Anderson

[11] Patent Number: 5,583,980
[45] Date of Patent: Dec. 10, 1996

[54] TIME-SYNCHRONIZED ANNOTATION METHOD

[75] Inventor: Glen Anderson, Palo Alto, Calif.

[73] Assignee: Knowledge Media Inc., Ann Arbor, Mich.

[21] Appl. No.: 173,585

[22] Filed: Dec. 22, 1993

[51] Int. Cl.$^6$ ................................................ G06F 15/74
[52] U.S. Cl. .......................................................... 395/173
[58] Field of Search .................................. 395/119, 118, 395/152, 155, 161, 137; 345/126, 122

[56] References Cited

U.S. PATENT DOCUMENTS

| | | | |
|---|---|---|---|
| 4,893,256 | 1/1990 | Rutherfoord et al. | 364/518 |
| 4,958,297 | 9/1990 | Hansen | 364/518 |
| 4,965,741 | 10/1990 | Winchell et al. | 364/513 |
| 5,119,474 | 6/1992 | Beitel et al. | 395/154 |
| 5,146,552 | 9/1992 | Cassorla et al. | 395/145 |
| 5,230,041 | 7/1993 | Dinwiddie, Jr. | 395/162 |
| 5,231,578 | 7/1993 | Levin et al. | 395/419 |
| 5,239,466 | 8/1993 | Morgan et al. | 395/148 |

*Primary Examiner*—Phu K. Nguyen
*Attorney, Agent, or Firm*—Gifford, Krass, Groh, Sprinkle, Patmore, Anderson & Citkowski

[57] ABSTRACT

A method enables an image to be displayed along with annotations in synchronization with separate, time-based program material as might be found in a computer-based multimedia system. The time-based program material may include audio or video information, or a combination of these, as in a digital movie with the annotated image and movie being accessed from a high-capacity storage means, such as a CD-ROM, and played in separate windows on the same display screen. The method provides smooth, real-time annotation of the on-screen image by synchronizing the movement of a pen image with very low flicker and with little overhead in terms of system performance and memory allocation. This improved performance stems from the inventive use of multiple off-screen buffers, and the processing of the previously stored annotations in the form of multiple data records including temporal and spatial information relating to the annotations as originally performed. The data records are processed during predetermined time periods, with image information being transferred into and out of these various off-screen buffers so as to facilitate real-time annotation in synchronization with the time-based program material.

24 Claims, 6 Drawing Sheets

TIME-SYNCHRONIZED ANNOTATION METHOD

FIELD OF THE INVENTION

The present invention relates generally to computer-based image annotation, and, in particular, to a method whereby an on-screen image may be smoothly annotated in synchronization with an associated time-based audio or video program such as a digital movie.

BACKGROUND OF THE INVENTION

The enhanced processing power of the modern desktop computer has made possible highly sophisticated multimedia presentation systems, wherein various elements such as sound, video and animation are combined for the purposes of entertainment, education, training, and so forth. Such multimedia systems are capable of supporting high-quality visual and audio features such as high-resolution color graphics, including on-screen digital "movies", and stereo sound. Considerable multimedia-based hardware and software products are now available from a wide variety of vendors. QuickTime™, for example, Apple Computer Inc.'s multimedia software standard, gives users a way to display, compress, copy and paste time-based data. QuickTime 1.5, introduced last fall, further supports Kodak's Photo CD standard, enabling high-resolution imagery stored on compact disk read-only memory (CD-ROM) to be integrated into the application.

Such multimedia systems are particularly convenient for training and education, since a number of stimuli may be simultaneously presented, thereby enabling a viewer to maximize the intake of information. For example, in one area of the screen animated graphics information may be displayed while, in another area of the screen, a real-time digital movie may be presented. However, even with the multiplicity of audio and visual stimuli made possible by such multimedia presentation systems, it may at times be difficult for an observer to follow along and coordinate the various inputs.

The need exists for an annotation scheme to bridge two or more aspects of a multimedia presentation in order to improve the relationship between them. For example, graphical information in one window may be annotated in time synchronization with an ongoing time-based audio or video program, such as a digital movie occurring in a different window on the same screen. Known animation techniques, such as exclusive-OR raster operations, or the use of a single off-screen buffer, are ineffective, resulting in line drawing with undesirable visual disruption such as "flicker". In order for such multimedia graphical information to be smoothly annotated, a method specifically directed toward the annotation of a graphical image is required, preferably a method that may be easily adapted for synchronization with other audio or visual information, including a digital movie which may be progressing in a different window on the same screen.

SUMMARY OF THE INVENTION

The present invention method provides smooth, real-time annotation of an on-screen image in time synchronization with a digital movie or other time-based program material. The method includes the step of manually annotating the image, and storing the image along with data records which contain information used to reenact the annotations on screen. In a typical environment, the image is displayed in a first window on a display screen and related time-based program material, such as a digital movie, is displayed in a second window on the same screen.

The data records are then processed to reenact the annotation of the image in synchronization with the movie, using a visual representation of an annotation-oriented implement called a "pen image." The data records may contain spatial information, temporal information, or both, as well as commands such as pen up/down, pen image color, and so forth. When these records are processed, the movements made during the manual annotation of the image are faithfully reproduced, both in terms of the X-Y movement of the pen image relative to the image and the amount of time consumed to make such movements.

The method provides smooth, time-synchronized annotation of an on-screen image with minimal flicker and overhead in terms of system requirements and memory allocation. Delay between draw operations are minimized, resulting in annotation lines, characters and other markings to appear as a natural, real-time rendering.

The movement of the pen image, which may be representative of any implement associated with annotative writing, pointing, and the like, is controlled by the data records, which are preferably captured through a graphics tablet. The data records are typically processed sequentially, with the pen image being modified in accordance with any positional, delay and pen up/down information stored in the records. However, the annotation function does not just track the progress of other time-based material in linear time, but also automatically synchronizes to any random time-oriented changes caused by the user or the application. For example, if the user drags a movie slider backwards in time, the screen image is automatically erased and re-rendered, and the annotation time is reset, thereby enabling the annotation display to catch up to the current movie time on the next call to the annotation playback function. Additionally, although it is assumed that in most circumstances time advances in real time, the application may also synchronize the annotations to time-based material played either slower or faster than the natural or real-time rate at which such material was initially captured.

Three off-screen buffers are preferably used to store intermediate data for the process of smoothly annotating the pen image and line drawing on the screen and the window image. One of the buffers stores the pen image. Two other buffers provide for temporary storage of information relating to the areas of the screen associated with the pen image during the processing of previous and current data records.

DETAILED DESCRIPTION OF THE PREFERRED EMBODIMENTS

The present invention concerns methods for annotating an image on a computer-oriented display device such as a cathode ray tube (CRT), flat-panel display, or the like. The method includes two parts, the first being the manual annotation of the image using an input device such as a graphics tablet, followed by the subsequent storage of the image and the lines and other markings made during this annotation input process. The second portion of the method concerns the playback of the image along with the annotations in a time-synchronized manner, preferably in coordination with some other form of audio and/or video time-based material such as an accompanying animated graphical program or digital video "movie".

Since the annotations made on the image during playback mode are synchronized in real time along with other audio/visual information, previous rasterization techniques are of limited utility. Specifically, computer graphics algorithms and so forth based on exclusive-OR (XOR) display techniques, such as those associated with cursor positioning, would produce undesirable flicker for the present application due to the level of screen updating required and the potential variability in the size of the pen image and the scale of the markings required to be rendered during a particular time period.

Techniques which take advantage of an off-screen buffer memory help to alleviate problems associated with screen updating by loading updated information into the buffer then writing the entire buffer to the screen during a convenient period. However, in the case of real-time annotation, markings can be made at various speeds and in any area of the screen or window containing the image to be annotated, and also with complexity varying as a function of time period and subject matter. As such, these single-buffer techniques are similarly incompatible with the degree of smooth, sophisticated annotation anticipated by the present invention.

Figure 1:
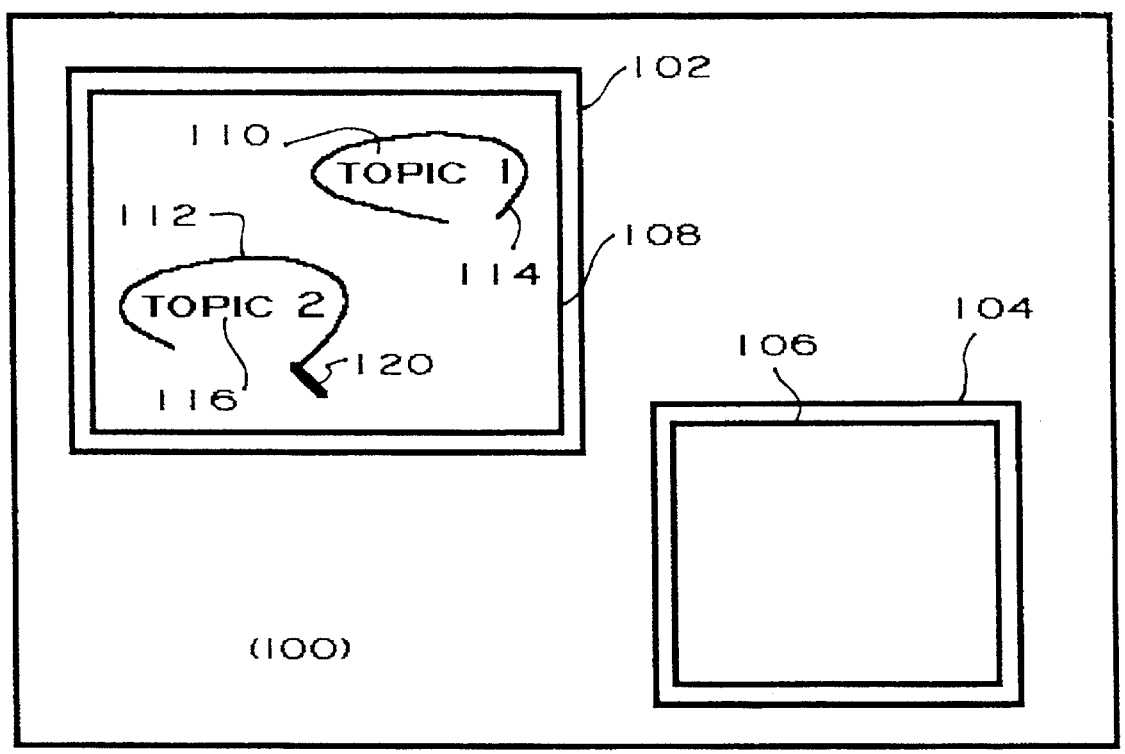
FIG. 1 is a drawing of a screen with multiple windows, one of the windows including visual topics and an annotation in progress.

In order to minimize or eliminate undesirable visual side effects associated with the annotation process, the present invention reads back information relating to the previously stored annotations in the form of data records which may contain spatial, temporal and other operational commands. The present invention preferably uses three buffers, writing into and out of these buffers in a unique way to minimize such side effects while updating at each time period. A first buffer contains an image of an implement associated with annotation, such as the image of a pen, pencil, pointer, human hand, wand, etc. Although for the purposes of this disclosure and related claims, this buffer may be termed the "pen buffer" or "pen-image buffer" it should be understood that in keeping with the present invention, this buffer may store the image any type of implement or instrument which might be associated with image annotation. The other two buffers store areas of the screen relating to the position of the pen image at the conclusion of a previous time period and the position of the pen image when the data records associated the current time period are finished being processed. These two buffers are termed the "old buffer" and "current buffer", respectively Now making reference to the figures, FIG. 1 is a drawing of a screen of a display device associated with a system which takes advantage of the present invention. On this screen 100 there exists two windows 102 and 104, though additional windows may be present, and they may be overlapping, hidden, and so forth. These windows present different media elements such as photographs in electronic form, graphs, text, hand-drawn slides, movie sequences of audio-visual information called "movies", and so forth.

In window 102 there is an image 108, hereinafter referred to as the "window image". This window image 108 may consist of any of the types of visual information just described. In addition, there is an image of an implement 120, this being the pen image previously introduced, which overlays the window image 108. This pen image 120 may be any size relative to the window image 108.

In the preferred embodiment, the pen image 120 moves in relation to the window image and in a time-synchronized manner with respect to the progress of an associated audio or audio/visual time-based program, such as digital movie 106 in window 104. The spatial relation of window 104 to window 102 is arbitrary, and may include the case of one of these windows overlapping the other, or with one window being entirely hidden from view. It may also be the case that the two windows are presented on entirely different display devices in the case that one or more of the available display devices are particularly suited for a specific purpose. All that is necessary is that the annotation of the window image be in synchronization with other time-based data.

The spatial movement of the pen image 120 is controlled by a series of data records. Information stored within these data records is captured via an input device such as a graphics tablet, though other forms of graphical input devices are applicable, including the use of a pen-based computer, on-screen drawing, and so forth. Regardless of the input device used, the movements made represent the actual movements of an individual performing an initial, manual annotation of at least a portion of the window image. The subsequent playback of the data records controls the movement of the pen image 120 on the window image 108, and gives an observer the impression of a synchronized annotation of window image 108. As the pen image moves, it draws lines, letters or other markings on the window image corresponding to the pen-down motion of the graphical input device upon original capture. The movement of the pen image and the annotation of the window image may thereby enhance the educational value of a multimedia presentation, for example.

The playback application handles many tasks. One of these tasks is to call the appropriate operating system functions in order to advance the time of the movie or other program. Another task is to call the functions that process the data records which store the movement of the pen image to draw lines on the window image in time synchronization with the movie. However, the annotation display does not just track the progress of the movie in linear time, but also automatically synchronizes to any random change in movie time caused by the user or the application. For example, if the user drags a slider or other such input device or icon associated with movie playback backwards in time, the screen image is automatically erased and re-rendered, and the annotation time is reset, thereby enabling the annotation display to catch up to the current movie time on the next call to the annotation playback function. Additionally, although it is assumed that in most circumstances the movie or other time-based program advances in real time, the application may also play the movie, either slower or faster than the natural or real-time rate.

In FIG. 1, window image 108 displayed in window 102 on screen 100 contains two topics 110 and 116, though many such topics may be possible and, as previously mentioned, are not limited to textual information but may also include graphical information, digitized photographic matter, and so forth. In the case shown, topic 1, depicted by numerical reference 110, has been previously annotated in the form of an encircling line 114 which was entered via an input device such as a graphics tablet. Topic 2, that depicted by numerical reference 116, on the other hand, is in the process of being annotated in the form of an encircling line 112 drawn with the pen image 120.

Figure 2A:
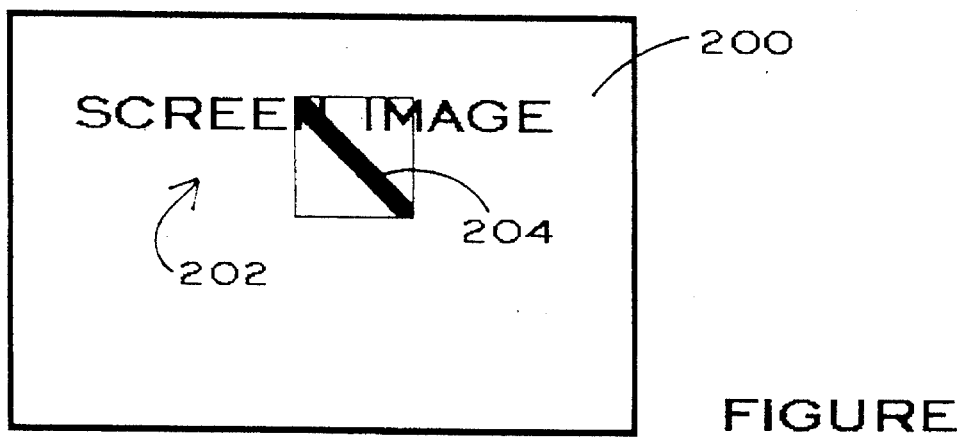
FIG. 2A is a drawing of a screen image including a pen image before calling the annotation function of the present invention.
Figure 2B:
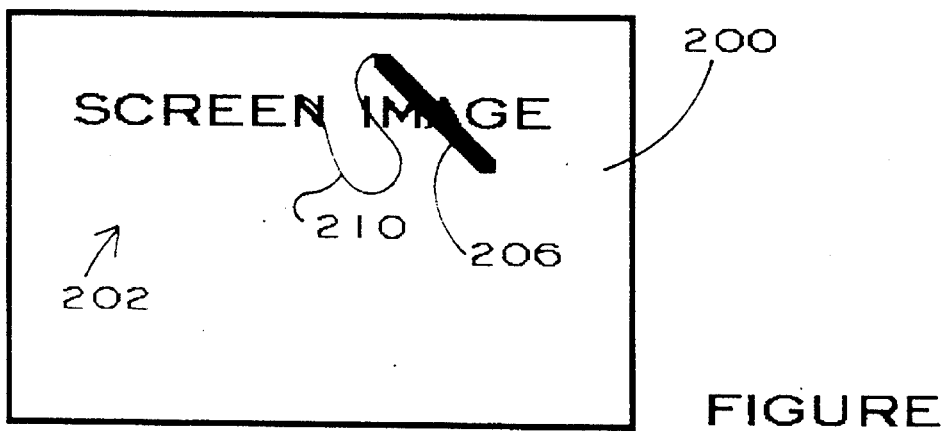
FIG. 2B is a drawing of the screen image of FIG. 2A after an annotation function call, resulting in the movement of the pen image and a line being drawn on the screen.

FIGS. 2A and 2B depict a screen image 200 respectively before and after the playback of annotation line 210 in FIG. 2B. The topic being annotated in this case is the textual information "SCREEN IMAGE" 202 and a rod-shaped implement 204 in FIG. 2A and 206 in FIG. 2B is, in this case, used as the pen image.

The data records for the pen image movements, line drawing and any other related commands are preferably stored in a one-bite encoding such that the most significant four bits store the DELTA-X value, with the least significant four bits storing the DELTA-Y value. Each DELTA value is stored in a two's complement encoding such that the expressible range of values is from −7 (encoded as the four binary digits 1001) to zero (encoded as the four binary digits 0000) to +7 (encoded as the four binary digits 0111). Although this is the preferred encoding format, other formats are possible, including the use of multiple bytes for higher resolution, and so forth.

Also, in the preferred encoding format, the four-bit binary encoding 1000 of each DELTA value is reserved for special purposes. For example, when the DELTA-X value is set to the binary encoding 1000, this is taken to mean that the least significant four bits refer not to a positional value but to a delay measured in terms of microprocessor clock cycles. This specially encoded record, hereinafter referred to as a "delay record", is the means of synchronizing the movements of the pen image with the real-time playback of the associated time-based program material. When the DELTA-Y value is set to the binary encoding 1000, the most significant four bits may be interpreted to mean operation codes (op codes) for special records, including change of pen-image color or pen up/pen down commands. The pen up/down commands are the means by which lines of arbitrary width are drawn in real time on the window image.

It is also possible and may be preferable in some circumstances to use special op codes in the annotation data for the purpose of textural rendering. For example, a special code might signify that a letter is to be drawn, in which case the standard operating system font-rendering services may be used at this time to call a "draw text" function. In such a case, the drawing of the desired letter is treated just like the rendering of a DELTA-X/DELTA-Y pen movement with the pen down but instead of drawing of the annotation lines to the screen and off screen buffers, as described in detail below, this system-level letter rendering function is called instead. All other handling of the font-rendering is identical to the procedure described below for the drawing of annotation lines, however. Moreover, such special subroutine calls need not be limited to letter or text formation, but may refer instead to available or customized symbols, icons, textures, numbers, foreign characters, and so forth.

The real-time processing of the data values contained within the records proceeds as follows. The pen image starts in a known initial X-Y coordinate position on the window image. Data records are then processed sequentially by reading the DELTA-X and DELTA-Y values, and modifying the current pen image position by adding these values to the current X and Y coordinates, respectively. When a delay record is processed, the delay in cycles per second is accumulated.

Records are processed sequentially until the accumulated delay equals or exceeds current movie time. If the latest pen up/down demand indicates a pen up condition, no lines are drawn for further pen movements. However, if the latest pen up/down command indicates a pen-down condition, lines of the appropriate size are drawn on the window image as shown in the accompanying figures.

Three off-screen buffers are used to store intermediate data for the process of smoothly animating the pen image and line drawing on the screen buffer for the window image. This technique results in real-time movement of the pen image with very low flicker and little performance degradation for a given amount of memory overhead. The delay time between draw commands is minimized, and the drawing of lines on the screen image is optimized to appear as a natural real-time rendering.

To optimize computation, these off-screen buffers may be equally sized, both in terms of coordinate dimension and pixel depth. However, such strict dimensional compatibility among buffers is not necessary to be in keeping with the present method, since the operating system or auxiliary software may perform any necessary pixel-depth conversions or spatial scaling during rasterization. Therefore, although much of the description contained herein, including figure references, allude to equally dimensioned square off-screen buffers images, it should be understood that buffers having inconsistent X, Y and Z coordinates may nevertheless be used as part of this invention. Additionally, although this description concentrates on annotation in the form of line rendering, it should likewise be understood that this method is extendable and applicable to any types of markings that may be made during the initial annotation, regardless of the input device used, including the text formation the use of drawing primitives.

Figure 3:
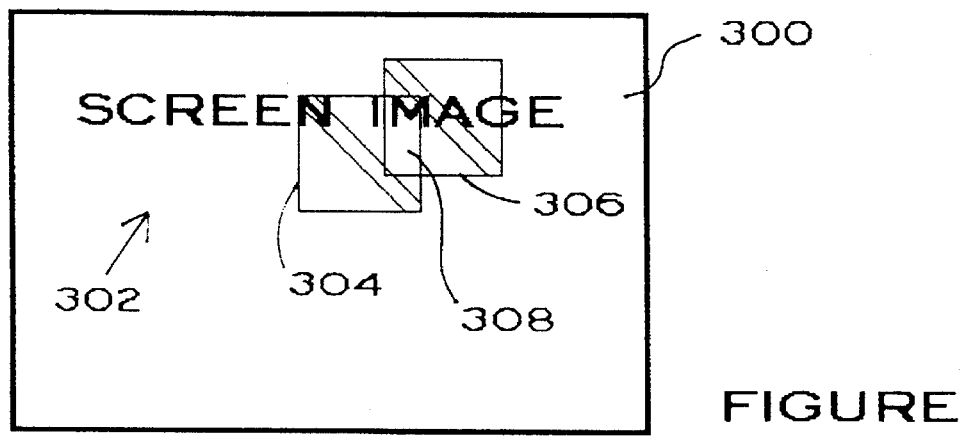
FIG. 3 is a drawing of the screen image used to illustrate the contents of the old and current buffers, and their region of overlap.

FIG. 3 depicts a window 300 containing a screen image 302. The position from the previous function call (or known initial values for the first iteration) is called the old pen image position and is illustrated by area 304 in FIG. 3. The information associated with that portion of the screen image contained within rectangle 306 is representative of the information contained within the current buffer. For the purposes of updating the buffers and the screen, it is also important to note area 308 representing any overlap between the old and current buffers storing image information representative of the old and current pen-image positions.

While the data contained within the old, current and pen-image buffers are, for the purposes of this discussion, representative of rectangular or square shapes within the window image, these shapes may be arbitrary, and the buffers may exist in arbitrary memory locations, with the indexing to the old and current pen image positions being referenced to any point represented by the buffer.

The annotation algorithm consists of a series of steps performed during each call to the functions that move the pen image and mark on the screen. The frequency of the calls to this function is arbitrary and determined by the application. On any function call, the pen image is moved and lines are drawn or text is formed according to as many records necessary so as to cause the pen image time to equal or exceed the movie time. This ensures that the pen image movements and drawn lines will have "caught up" in real time to the current point in the real-time playback of the movie or other time-based material. Before the series of steps is performed, the X-Y coordinates associated with all DELTA-X and DELTA-Y coordinate pairs may be precomputed as a performance enhancement to the algorithm. This is not necessary, however, to take advantage of the multi-buffered pen image movement and line-drawing algorithm described in detail below.

Also, as an initialization procedure, a flag, herein called OLD_VALID, is set to FALSE to indicate that the old buffer does not contain valid data, and that the pen image is not present on the screen image. In this case, the current pen image position is set to known initial values. At the start of any call to the playback function, the old buffer will either contain garbage (OLD_VALID FALSE), or it will contain the image of the screen with all annotations up to the point of the last call to the playback function, but without any part of the pen image. OLD_VALID FALSE will occur with the initial start up of the playback routine or with the first call to the function as part of a non-sequential entry into the routine, as would occur if an operator "rewound" the movie or other associated time-based program material through the movement of a time slider or other time-control mechanism.

Regardless of when the playback function is called, in all cases the current buffer must be prepared in order to satisfy the conditions necessary to function as an old buffer on the next time around. The current buffer itself is never sourced during a playback function call, as it is merely prepared to function as the old buffer for the next time period. In the event of an OLD_VALID FALSE flag, the current buffer will be prepared by copying the area from the screen corresponding to the old pen image position to the current storage buffer. This particular operation is not specifically depicted in the figures. Once setting the current pen image position to a known initial value, at the end of the routine, when the pointers to the old and current buffers are swapped, the current buffer may safely and accurately be referenced as a newly-updated old buffer, and the steps described below may be performed.

On any non-initial call to the annotation function, the OLD_VALID flag will be set to TRUE and the old storage buffer will contain the screen image corresponding to the old pen image position, but without the actual image of the pen. In other words, as will be explained in the steps which follow, if the old storage buffer were copied to the screen the pen would effectively be erased. The old storage buffer is used to preserve the background window image because the area of the window image obscured by the drawing of the pen image itself is overwritten.

FIGS. 4A through 4J illustrate the status of the screen, old and current buffers, pen image buffer, old pen image position 410, current pen image 412, and overlap region 414 as the annotation function call proceeds, with the series of steps being performed upon each call to the function are as follows. First, the data records are iterated until the accumulated delay equals or exceeds the current movie time. This gives the number of records necessary to process during the function call for this particular time period, denoted by "N-data records" hereinafter. The X-Y coordinate pair for the pen image after the movements indicated by the accumulated DELTA-X and DELTA-Y values in the N-data records are processed in order to determine the X-Y coordinate pair associated with the current pen image position 412. The region of overlap 414, if any, between the pen image rectangle at the old pen image position and the pen image rectangle at the current pen image position is computed, this being termed the "overlap region" hereinafter.

Figure 4A:
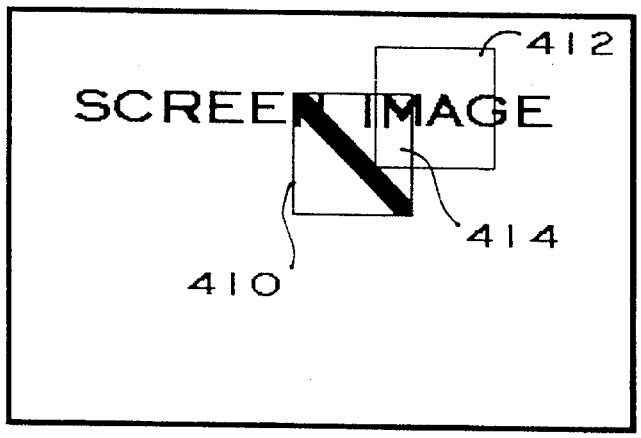
FIG. 4A shows the screen image and buffer contents prior to a non-initial call to the annotation function.
Figure 4A:
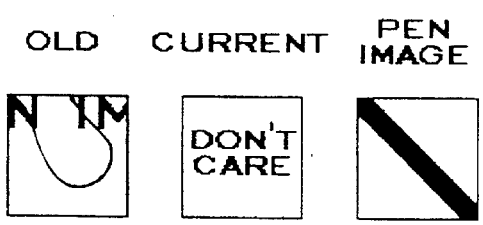

FIG. 4A shows the screen image 400 and these buffers before a typical function call in which the OLD_VALUE flag is TRUE. The content of the current buffer is shown to be empty since at the start of any call to the playback function, its contents are irrelevant.

Figure 4B:
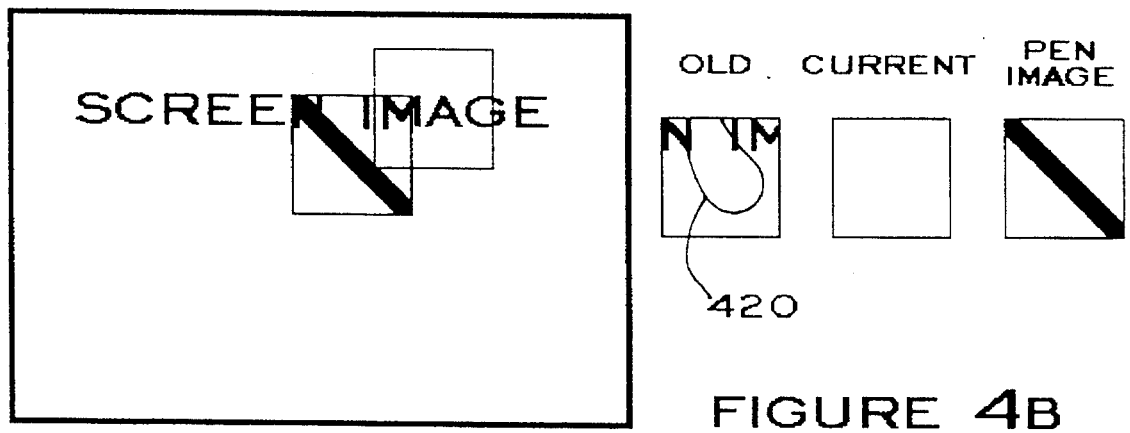
FIG. 4B is a drawing of a screen image, and illustrates the step of recording annotations in the old buffer.

The annotation lines corresponding to the N-data records are drawn into the old storage buffer as shown by wavy line 420 in FIG. 4B. It may be that the annotation lines do not intersect with the area of the window image that the old storage buffer represents. In such a case, the old storage buffer is simply not changed. In either case, this operation does not change the appearance of the image on the screen.

Figure 4C:
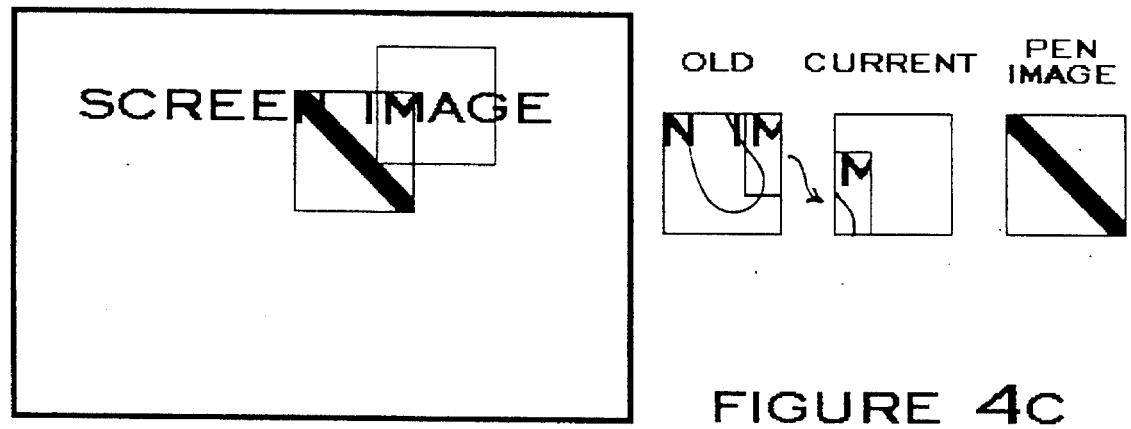
FIG. 4C illustrates the step of copying the non-overlapping region of the screen image into the current buffer.
Figure 4D:
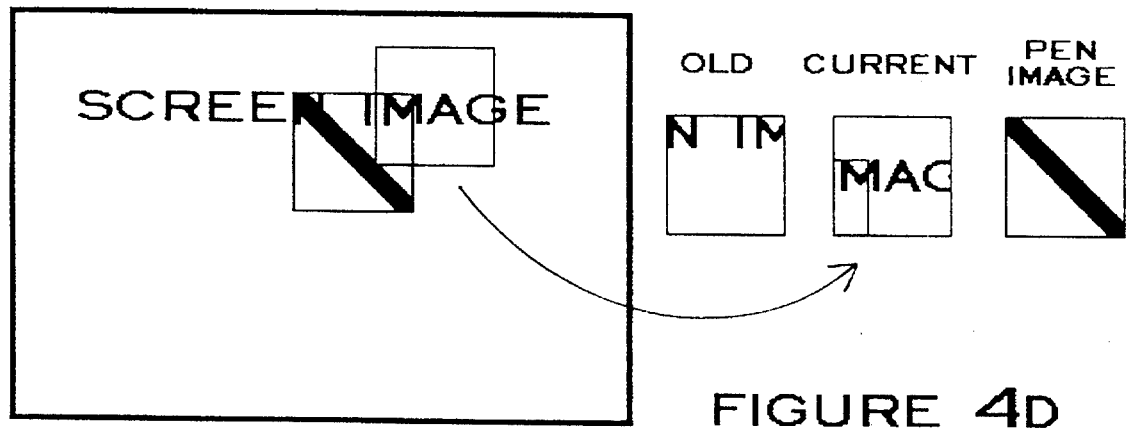
FIG. 4D illustrates the step of copying the non-overlap region of the current pen-image position into the current buffer.
Figure 4E:
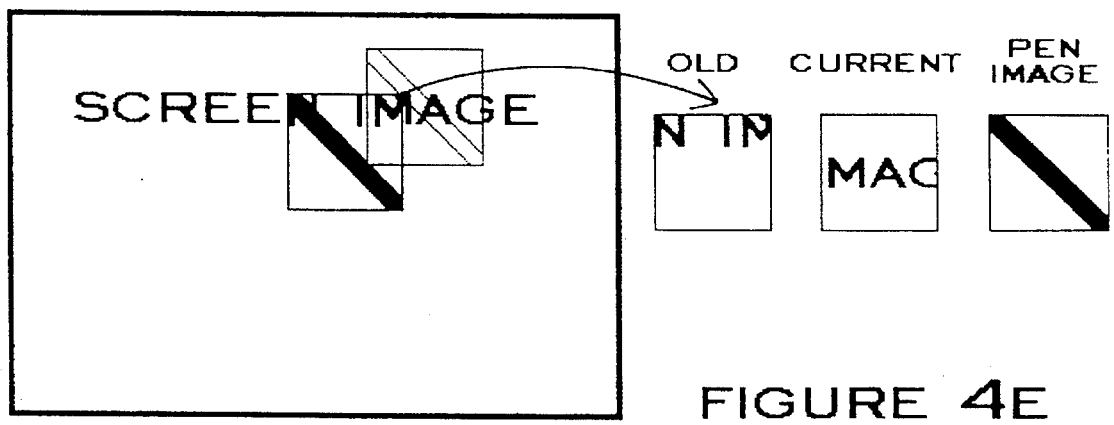
FIG. 4E illustrates the step of writing the portion of the pen image associated with the new pen-image position into the overlap region of the old buffer.

The current storage buffer is prepared as shown in FIG. 4C. The overlap region 414 is copied from the old storage buffer, whereas that area of the current storage buffer not contained in the overlap region is copied from the screen buffer, as depicted in FIG. 4D. As shown in FIG. 4E, that portion of the pen image 421 contained in the overlap region is transferred from the pen image buffer 430 are copied to the old storage buffer using a transparent pixel transfer raster operation. This is a standard pixel transfer raster operation in which a certain pixel value usually representing a color such as white, in the source image is designated "transparent" such that when individual pixels are copied from the source to the destination image, pixels in the source image having such a color value equal to the transparent color are not copied. The overall affect is a natural-looking overlay of all non-transparent pixels in the source image being transferred onto the destination image. The original pixels of the destination image corresponding to the same location of the non-transparent pixels in the source image are overwritten.

Figure 4F:
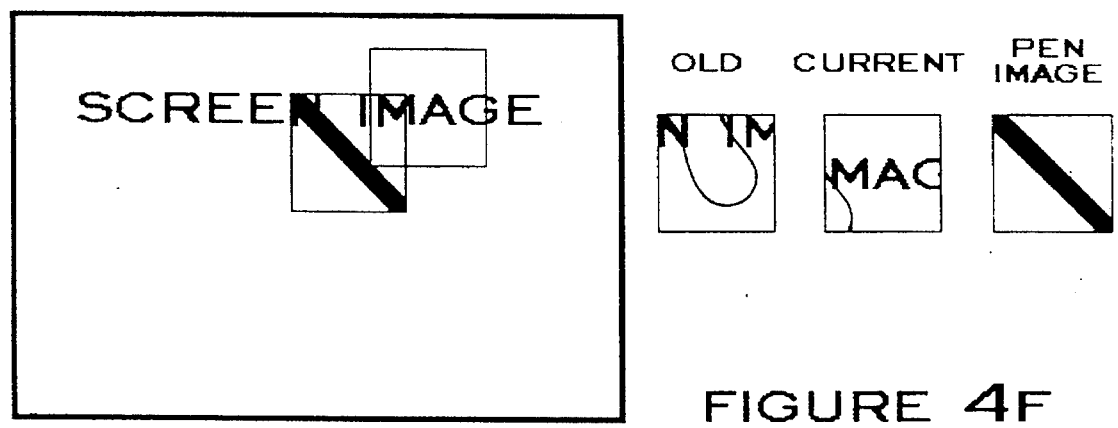
FIG. 4F illustrates the step of writing annotations to the screen image in the area associated with the current pen-image position.
Figure 4G:
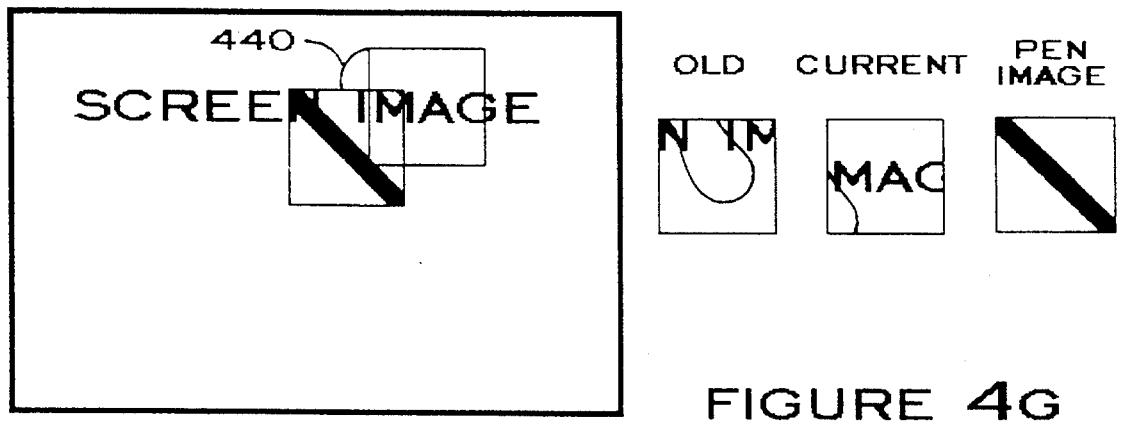
FIG. 4G illustrates the step of writing to the screen image annotations not contained within either the old or current buffers or overlap region.

Annotation lines represented by the N data records are drawn into the current non-overlap portion of the pen-image position by performing a graphics line draw for each data record for which the pen-down command has been given. Only those lines which are within the current pen image position area are drawn in this step, and since, in this example, no lines apart from those contained within the overlap region are present in the current pen-image position, the contents of the screen image is not changed as can be seen in FIG. 4F. As shown in FIG. 4G, annotation line 440 derived from the N-data records are drawn on the screen in a manner similar to the step used to draw lines into the current pen-image position.

Figure 4H:
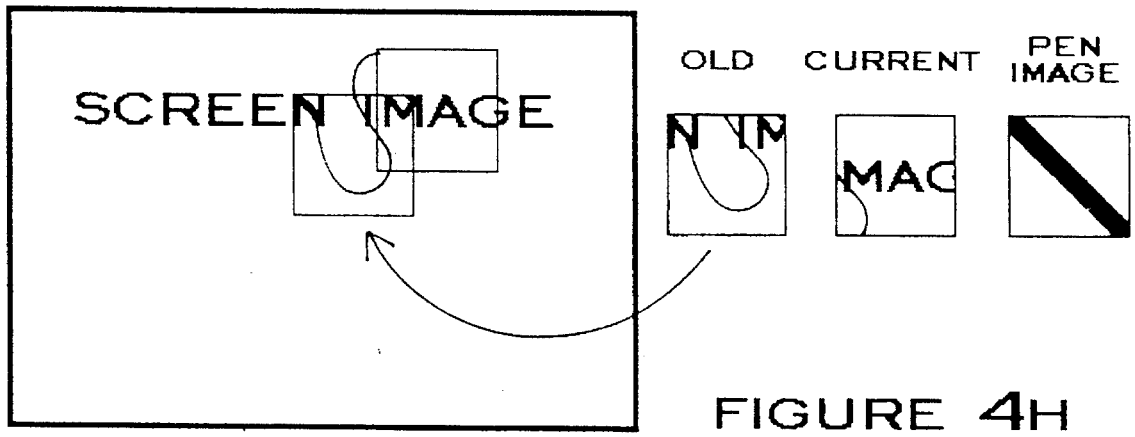
FIG. 4H illustrates the step of copying the old buffer into the old pen image position.

Referring to FIG. 4H, the old storage region is copied to the screen at the old pen image position. This erases the previous pen image drawn to the screen, but preserves the annotation lines since the algorithm has explicitly drawn them into the old buffer in a previous step. The step of copying the old storage buffer to the screen also draws that part of the pen image 421 previously written into the overlap region to the screen as written to the old storage buffer in the step depicted by FIG. 4E.

Figure 4I:
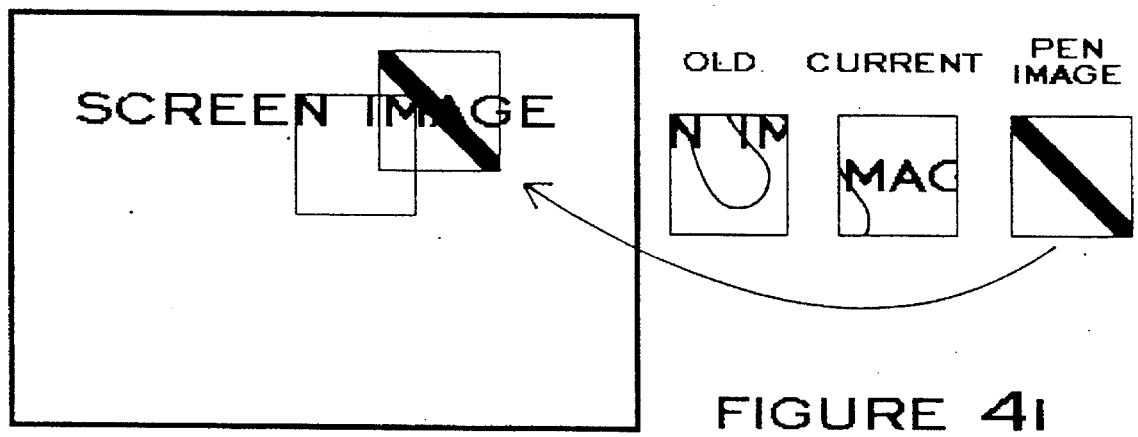
FIG. 4I illustrates the step of copying that part of the pen image buffer not contained in the overlap region to the screen.

In FIG. 4I, that part of the pen image buffer not in the overlap region is copied to the screen at the new pen image position, again using a transparent pixel transfer raster operation. This completes the drawing of the pen image to the screen for the current pen image position. Any annotation lines have already been drawn to the current pen-image position in the step depicted by FIG. 4F, so annotations have been preserved.

Figure 4J:
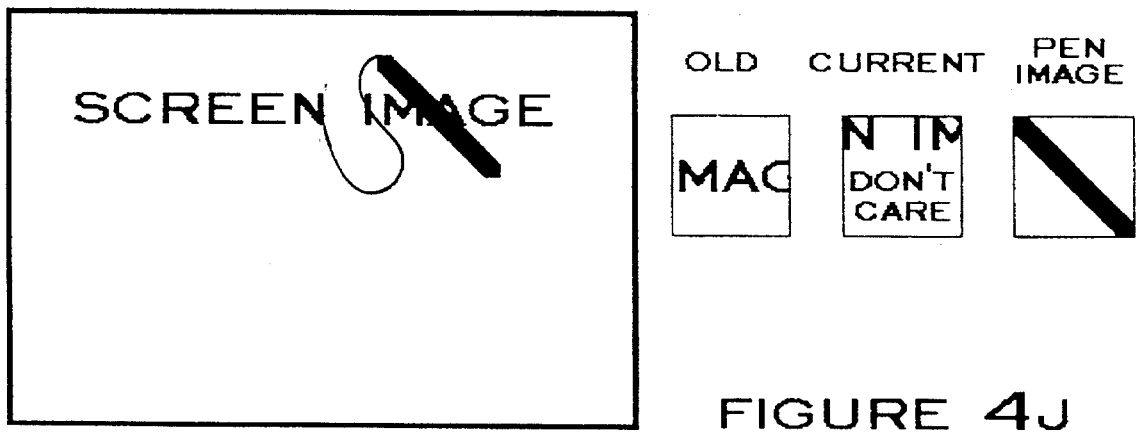
FIG. 4J illustrates the contents of the old and current buffers after swapping their respective pointers.

Finally, in FIG. 4J, memory pointers to the old and current storage areas are exchanged, establishing a foundation for the next iteration, and the OLD_VALID is set to TRUE, thus completing the processing of the N-data records for this particular time period. Although the current buffer shows a portion of the screen image, this is irrelevant, since upon any call to the playback function, its contents are irrelevant.

Figure 5:
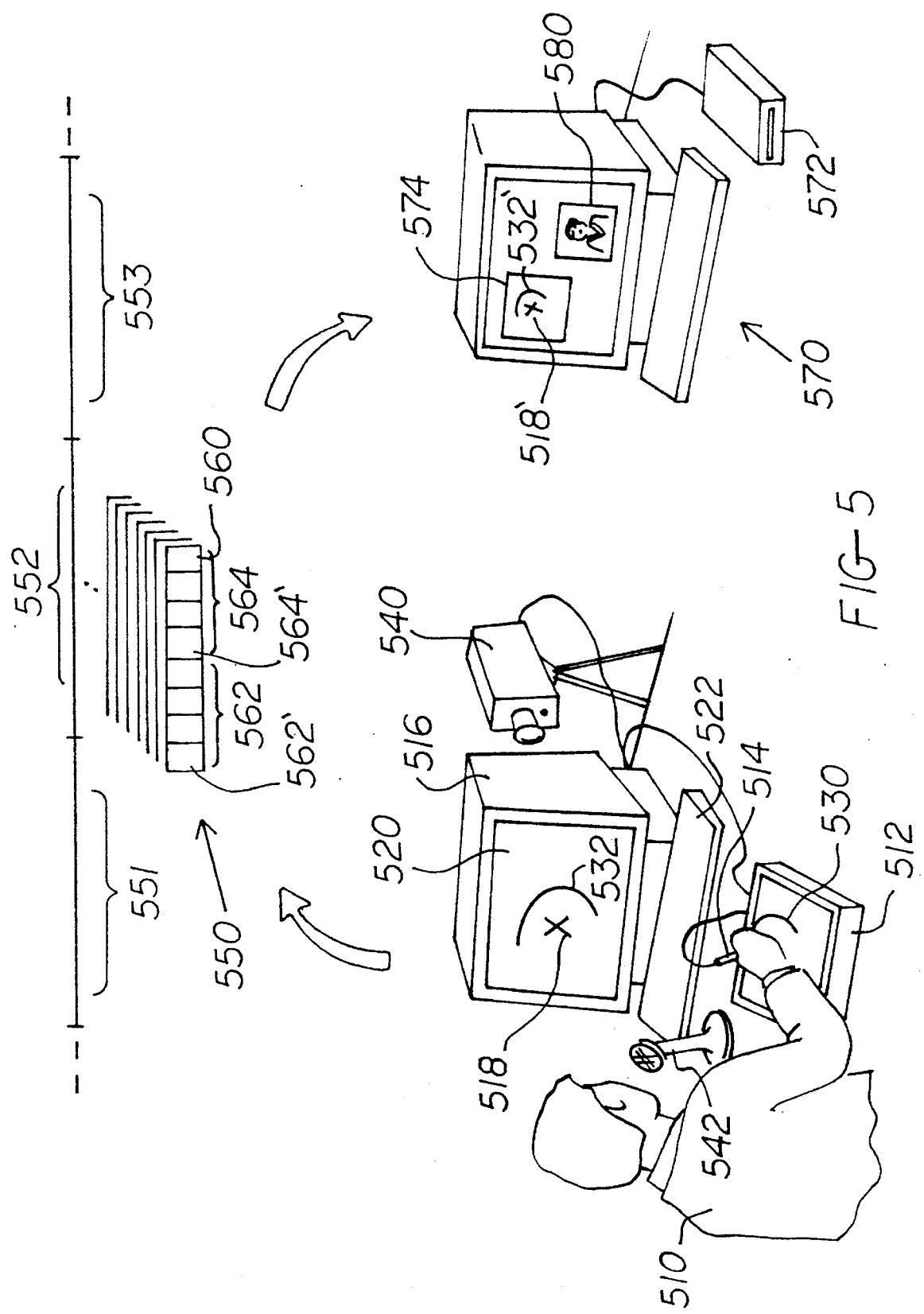
FIG. 5 is a drawing used to illustrate the method overall.

FIG. 5 helps to illustrate the overall method of the present invention. An operator 510 using a graphics tablet 512 having an input stylus 514, is used to annotate an image on the screen of a computer or workstation 516. The image 518, in this case an "X" is shown on a screen 520 of computer system 516. The computer may also have a keyboard 522 for inputing commands. As the operator 510 draws a line 530 on tablet 512, his movement is translated and shown on the screen 520 as line 532, in this case encircling the image X. A video camera 540 may efficiently be used at this time for the production of the digital movie with which the annotation line 532 and other markings made or graphics tablet 512 will be synchronized. A microphone 542 may also be used to record audio comments uttered by operator 510 during this initial annotation process.

The movements made by the operator 510 on graphics tablet 512 are recorded as plurality of data records 550 associated with at time period 552, the duration of this time period being consistent with previous time period such as 551 and subsequent time period such as 553. These data records 550 may be of any size and may vary in number depending upon the amount of information gathered during a particular time period. Assuming however that each record is in the form of a single byte such as that depicted by box 560, in one embodiment the most significant four bits 562 are used to store DELTA-X values associated with the movements of stylus 514 on graphics input tablet 512, with the least significant four bit storing the DELTA-Y value. These values are stored in two's complement encoding, as previously described. The most significant bit 562' and the most significant bit 564' of their respective upper and lower halves of the bite 560, may be used for special purposes such as delay and pen up/pen down.

A set of data records such as those shown in 550 are generated for each time period such as period 552 until the entire image has been annotated. Subsequently, this image and these records are made available to the same or a different system and monitor 570, for example, being stored in a CD-ROM reader 572. When this CD-ROM reader is made operative, the image is replayed in a first window 574, and the original annotation 532 is reenacted as line 532', in this case encircling the retrieved image 518'. Although the image to be annotated and the data records associated with those annotations may conveniently be stored on CD-ROM, the instant method is not limited to this and may include delivery of data via a local or wide-area network, floppy or hard-disk drive or some or all of this information may be preloaded into computer random-access memory (RAM).

Significantly, the present method also allows the editing of annotation records after recording. An operator has the capability to adjust the overall spatial position and time synchronization of the entire record set or individual records, including adding and deleting records, changing pen color and, in general, creating any arbitrary graphic images within the annotation record after the fact, including the generation of an entire annotation data set artificially, whether or not based upon the capture of an initial manual annotation step. In a reduced capacity version of the present invention, the system may be used as a time-synchronized pointing system only, that is, with no pen-down operands and no line drawing or letter formation on the screen.

In a second window 580, a digital movie is played, which might be the image of operator 510 having been recorded with camera 540 and microphone 542. The actions of the operator 510 in this digital movie, owing to the manner in which the data records 550 are interpreted by the present invention method, appears in synchronization with the annotation occurring in the first window 574. Through the use of the buffers, and so forth, as previously described, the annotations occurring in the first window 574 are smooth and free of undesirable visual side effects, such as flicker.

Having thus described my system, I claim:

1. A method of recording and re-enacting the annotation of an image, comprising the steps of:

storing information representative of annotations made to an image in the form of a plurality of time-sequenced data records;

simultaneously displaying the time-based program and the image in electronic form; and re-enacting the annotation of the image in electronic form by processing the data records in synchronization with the display of the time-based program.

2. The method of claim 1 wherein the annotations include pointing to at least a portion of the image.

3. The method of claim 1 wherein the annotations include drawing a line associated with at least a portion of the image.

4. The method of claim 1 wherein the annotations include forming a character associated with at least a portion of the image.

5. The method of claim 1, wherein the time-based program includes audio information.

6. The method of claim 1, wherein the time-based program includes video information.

7. The method of claim 1, wherein a data record includes spatial information relating to the annotations.

8. The method of claim 1, wherein a data record includes temporal information relating to the annotations.

9. The method of claim 1, wherein a data record includes information relating to a graphical representation of an annotating implement displayed during the reenactment of the annotations.

10. The method of claim 1, wherein a data record includes a pointer to a previously stored graphical representation used in re-enacting the visual references.

11. The method of claim 10, wherein the previously stored graphical representation includes text.

12. The method of claim 1, further including the step of editing the data records.

13. A method of presenting an image with annotations synchronized to a separate time-based program, comprising the steps of:

manually annotating the image based upon movements entered through a graphical input device;

storing data representative of the annotations in the form of one or more time-sequenced data records;

displaying the image on the screen of a display device;

processing the data records by transferring the previously recorded annotations to the displayed image; and displaying the annotations in synchronization with a separate time-based program.

14. The method of claim 13 wherein the time-based program includes a moving image.

15. The method of claim 13 wherein the data records contain x-y coordinates associated with the movements.

16. The method of claim 13 wherein the data records contain delay information associated with the movements.

17. The method of claim 13, further including the steps of:

storing an image of an implement associated with the annotations; and transferring the image of the implement to the displayed image as part of the step of processing the data records associated with the time period.

18. The method of claim 17, further including the steps of:

storing, in an old buffer, data representative of an area of the displayed image associated with the position of the implement during a previous time period;

storing, in a current buffer, data representative of an area of the displayed image associated with the position of the implement during the current time period;

modifying the old and new buffers in accordance with information contained in the data records;

copying the modified old buffer to the screen in its entirety at the position of the implement during the previous time period in order to transfer the annotations previously recorded during the time period; and copying the modified new buffer in its entirety into the old buffer.

19. The method of claim 13, further including the step of sequentially processing the data records until the accumulated time delay exceeds or equals the playback time of the separate time-based program.

20. The method of claim 19, wherein the step of sequentially processing the data records until the accumulated time delay exceeds or equals the playback time of the separate time-based program follows a backward time movement of the separate time-based program.

21. A method annotating an image in synchronization with a related time-based program, comprising the steps of:

displaying an image to be annotated;

manually annotating the image with movements made on a graphical input device;

recording the annotations as a series of data records including spatial and temporal information associated with the movement of the input device;

allocating storage space for a plurality of buffers, including:

a pen image buffer for storing an image of an implement associated with annotation called a pen image, an old buffer for storing a portion of the image associated with a previous time period, this being the previous pen-image position, and a current buffer for storing a portion of the image associated with the image associated substantially with the current time, this being the current pen-image position;

processing the data records to perform the steps of:

transferring annotations associated with the previous pen-image position into the old buffer using a graphical line draw;

copying the region of overlap, if any, between the old buffer and current buffer from the old buffer into the corresponding area of the current buffer;

copying the area of the screen image not associated with the overlap region into the current buffer;

copying any portion of the pen image which intersects the overlap region when the pen image is juxtaposed onto the current pen image position into the corresponding area of the old buffer;

transferring annotations associated with the current pen-image position into the current pen-image position using a graphical line draw;

transferring annotations not associated with the previous or current pen-image positions into the corresponding area of the screen buffer using a graphical line draw;

copying the old buffer into screen buffer in the old pen-image position;

copying the pen image into screen buffer in the current pen-image position using a transparent copy raster operation; and copying the contents of the current buffer into the old buffer.

22. The method of claim 1, wherein the time-based program and image in electronic form are simultaneously displayed in seperate windows on a display screen.

23. The method of claim 1, wherein the separate time-based program includes video movie.

24. The method of claim 23, wherein the movie includes the likeness of an individual explaining the annotations.

\* \* \* \* \*